United States Patent [19]
David

[11] 3,753,321
[45] Aug. 21, 1973

[54] CAM GRINDERS

[75] Inventor: Curt Ludwig David, Peterborough, England

[73] Assignee: The Newall Engineering Company Limited, Old Fletton, Peterborough, England

[22] Filed: July 19, 1971

[21] Appl. No.: 163,601

[52] U.S. Cl. ............................................. 51/101 R
[51] Int. Cl. .......................................... B24b 17/02
[58] Field of Search ................... 51/101 R, 101 LG, 51/105 EC, 281 R

[56] References Cited
UNITED STATES PATENTS

| 3,274,736 | 9/1966 | Brokaw | 51/101 R X |
| 2,579,337 | 12/1951 | Reaser | 51/101 R |
| 3,663,188 | 5/1972 | Hoglund | 51/101 R |
| 2,964,885 | 12/1960 | Jalbert | 51/101 R |
| 3,482,357 | 12/1969 | Inaba | 51/101 R X |
| 3,621,618 | 11/1971 | Pleger | 51/101 R |

Primary Examiner—Donald G. Kelly
Attorney—Watson, Cole, Grindle & Watson

[57] ABSTRACT

A cam grinder in which the angular velocity of the workpiece is cyclically varied to reduce variations in the contour velocity. A work table is controlled by a master cam to move relative to a grinding wheel in accord with the desired profile. The workpiece is driven by a spindle carrying a wheel driven by a belt which passes over a driving wheel. Additional longitudinal movement of the belt is introduced by a wheel mounted on a pivoted arm controlled by a control cam that is rotated in accord with the movements of the work table.

3 Claims, 4 Drawing Figures

PATENTED AUG 21 1973

3,753,321

INVENTOR
CURT LUDWIG DAVID

BY

Watson, Cole, Grindle & Watson
ATTORNEYS

CAM GRINDERS

This invention relates to cam grinders and particularly grinders adapted for grinding of cams on a cam shaft.

In grinders of this type the workpiece which is to be ground into the profile of a cam is supported by a table which allows the workpiece to be rotated and which is itself movable towards and away from a grinding wheel. The frame may for example be mounted on a pivot. The movement of the frame is normally controlled by a master cam which has a profile the same as or closely related to the desired profile of the workpiece so that as the workpiece is rotated the pressure exerted on the workpiece by the grinding wheel is periodically increased and decreased in accord with the desired profile. Ultimately this grinding operation imparts in general a non-circular cam shape to the workpiece.

However, with known apparatus the contact point between the grinding wheel and the workpiece does not always lie on a line connecting the axes of rotation of the grinding wheel and the workpiece. If the workpiece is driven with a uniform angular velocity, the contact point between the wheel and the workpiece does not move at a uniform rate around the contour of the workpiece. In certain places the contact point moves more quickly and in certain places it will move more slowly. In general the former places are the flanks of the cam and the latter are the parts around the toe of the cam.

Moreover, when the contour velocity, that is to say the speed of the contact point around the periphery of the workpiece, is high the grinding wheel is not able to remove material from the workpiece at as great a rate as it can where the contour velocity is lower. Since the contour velocity when the contact point is moving along a flank of the cam profile will be higher than when it moves around a concentric base circle but in fact material should be removed faster from the flanks than it is from the base circle, errors are produced during normal grinding. These errors can be corrected by a spark-out operation. A spark-out operation is however time-consuming.

The present invention concerns a grinder in which variations in the contour velocity are automatically reduced. This is achieved by cyclically varying the angular velocity of the workpiece, in conformity with the profile of the cam which is to be produced, to reduce variations in the contour velocity. In general this means a lowering of the angular velocity where the contour velocity would otherwise be high and an increase in the angular velocity where the contour velocity would otherwise be low. In essence, the angular velocity of the cam is regulated by a mechanism which provides a signal or parameter which is high when the angular velocity should be higher to counteract too low a contour velocity and low when the angular velocity should be lower to counteract too high a contour velocity. The cylce of operation of the mechanism is synchronised with the rotation of the workpiece.

In general the signal or parameter which is to control the variation in angular velocity is determined by the movements of the work table and may be derived from the master cam which controls the movements of the work table or as is preferable a control cam which has a profile derived from that of the master cam. This latter possibility is convenient where along a cam shaft a number of workpieces are to be ground with similar profiles but angularly displaced.

In a preferred form of the invention the workpiece is rotated by means of a spindle driven by a first wheel which may be a pulley. This wheel is itself driven by an elongate driving member, which may be a belt, that passes over the wheel. The member may be driven by a second wheel that is rotated at constant speed by a motor. The member may pass over a third wheel that is near the driving wheel and is freely and rotatably mounted on a movable member which carries a rotatable cam follower bearing on a control cam. Alternatively the second wheel may be mounted on a movable member which carries a control cam that bears on a follower that is positionally fixed.

The control cam would be driven in synchronism with a master cam controlling the relative movement of the work table and the grinding wheel. The control cam and the arm constitute a means arranged to produce, when a change in the angular velocity of the workpiece is required, additional local longitudinal movement of the endless member around the wheel driving the workpiece's spindle. The control cam would have a profile such that the additional local movement of the member around the said first wheel would continue for as long as the change in velocity were required. Its shape would therefore be a derivative of the shape of the master cam.

Reference hereinafter will be made to the accompanying drawings, in which.

Figure 1:
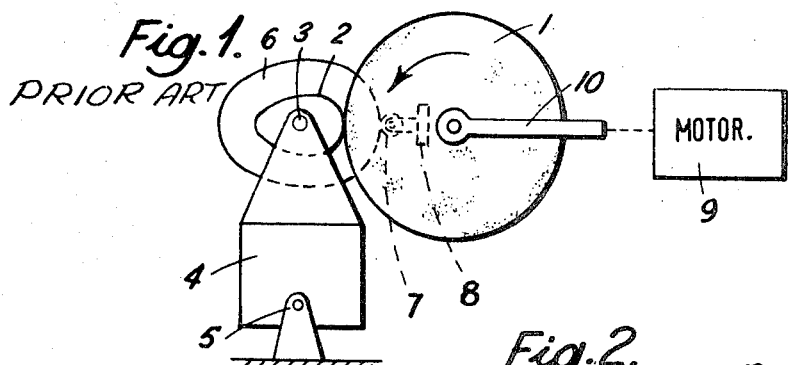
FIG. 1 illustrates diagrammatically a known form of cam grinder.

FIG. 1 shows in a simplified diagrammatic form a cam grinder including a grinding wheel 1, a workpiece 2 which is mounted on a spindle 3 for rotation about an axis parallel to the axis of the grinding wheel, and a work table 4 supporting the spindle 3 for rotation by a motor not shown. The work table 4 is movable towards and away from the grinding wheel and for this purpose is mounted on a pivot 5. The movements of the work table are controlled by a master cam 6 which is mounted on the spindle 3 for conjoint rotation with the workpiece 2. A rotary cam follower 7, which is carried on a fixed support 8, bears on the master cam 6 which is rotated in synchronism with the workpiece. The wheel 1 is rotated and is movable towards and away from the workpiece by a drive 9 operating a linkage 10.

Figure 2:
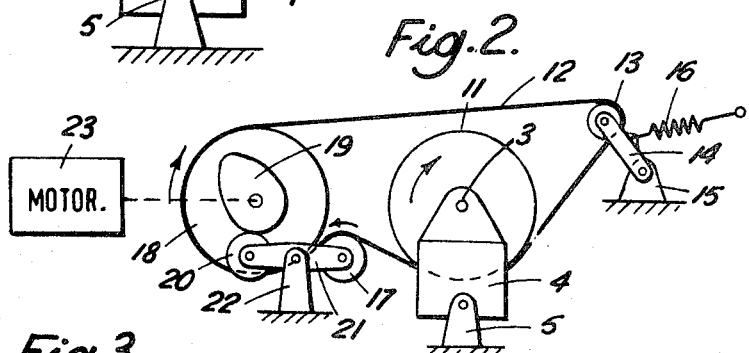
FIGS. 2, 3 and 4 illustrate three embodiments of the invention, constituting modifications to the apparatus of FIG. 1.

FIG. 2 illustrates one embodiment of an apparatus which together with the apparatus of FIG. 1 constitutes one embodiment of the invention. A pulley 11, constituting the said first wheel, is mounted on the spindle 3 which is the spindle on which the workpiece is mounted. Around the pulley 11 extends an endlesss member in the form of a pulley belt 12 which passes over a pulley 13 and another pulley 18 that constitutes the said second wheel. The pulley 13 is mounted at one end of a rotatable arm 14 of which the other end is pivoted on a support 15. The arm 14 is linked by a spring 6 to a fixed point. From the pulley 11 the pulley belt 12 extends over a small pulley 17, constituting the third wheel, close to the pulley 11, thence over the pulley 18 back to the pulley 13. The pulley 17 iss mounted on a movable member which could be a slider but is here a pivoted rocker arm 21 of which the other end carries a rotary cam follower 20 bearing against a control cam 19 mounted for conjoint rotation with the pulley 18. The rocker arm 21 is pivoted about a support 22. The control cam is disposed so that it rotates with the master cam that controls the work table 4. The phase of rotation of the control cam may be slightly in advance of that of the master cam. A motor 23 rotates the pulley 18 at constant speed.

When the follower 20 bears on a part of constant radius, the driven pulley 11 on the master spindle 3 rotates with uniform speed. When the control cam displaces the follower to cause the displacement of the intermediate pulley 17 in the direction of the movement of the belt the driven pulley is accelerated and when the displacement is in the opposite sense the driving belt is retarded.

Figure 3:
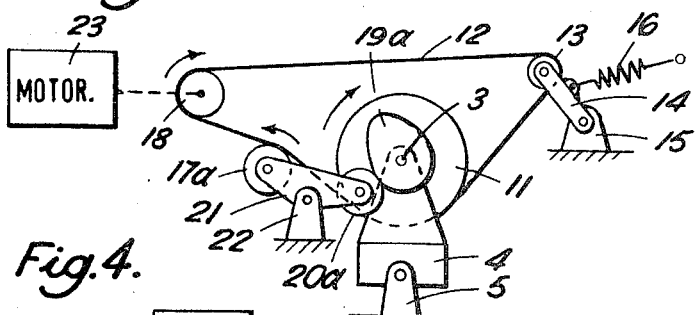

FIG. 3 shows a similar arrangement in which however a control cam 19a, corresponding to the control cam 19, is mounted on the spindle 3 and the configuration of the linked cam follower and pulley is reversed; the follower 20a bears on the control cam 19a and the pulley 17a at the other end of the rocker arm 21 bears on the pulley belt 12 between the pulley 11 and the pulley 18.

Figure 4:
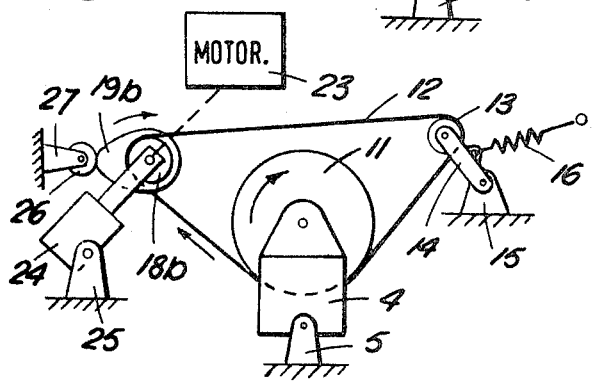

FIG. 4 shows another alternative arrangement in which a pulley 18b corresponding to the pulley 18 is itself mounted on a movable arm 24 which is pivoted about a support 25. The control cam 19b is as in the case of the embodiment of FIG. 2 mounted for rotation on the same axis as the pulley 18b. However, the cam 19b bears on a rotatable follower 26 which is positionally fixed, namely mounted on a fixed support 27. In this arrangement the rotation of the control cam moves the pulley 18b to effect changes in the movement of the belt 12 around the pulley 11 in the same manner as the pulleys 17 and 17a are caused to move in the apparatus described with reference to FIG. 2 to FIG. 3.

The profile of the control cam is readily derived from that of the master cam and should maintain constant the contour velocity of the contact point between the workpiece and the grinding wheel.

I claim:

1. A cam grinder comprising a grinding wheel, a work table mounted for movement towards and away from the grinding wheel, means for controlling the movements of the work table in accord with the desired cam profile of a workpiece, a driving spindle for the workpiece, a first wheel for driving the spindle, an endless drive member passing round the first wheel, a second wheel for transversing the drive member lengthwise, and means for producing additional local longitudinal movement of the drive member around the said first wheel in accord with the desired cam profile.

2. A cam grinder according to claim 1, in which the drive member passes over a third wheel which is located adjacent the first wheel and is freely and rotatably mounted on a movable member which carries a rotatable cam follower bearing on a control cam that is rotated in accord with the movements of the work table.

3. A cam gringer according to claim 1 in which the drive member passes over the second wheel which is mounted on a movable member which carries a control cam that bears on a follower that is positionally fixed.

* * * * *